United States Patent [19]

DeVre et al.

[11] Patent Number: 5,569,487
[45] Date of Patent: Oct. 29, 1996

[54] CAPACITOR DIELECTRICS OF SILICON-DOPED AMORPHOUS HYDROGENATED CARBON

[75] Inventors: Michael W. DeVre, Scotia; Steven M. Gasworth, Glenville, both of N.Y.

[73] Assignee: General Electric Company, Schenectady, N.Y.

[21] Appl. No.: 376,564

[22] Filed: Jan. 23, 1995

[51] Int. Cl.$^6$ .............................. B05D 5/12; B05D 3/06; H05H 1/24

[52] U.S. Cl. .............................. 427/81; 427/79; 427/577; 427/578; 427/580; 427/255.7; 437/919; 204/192.22

[58] Field of Search ............................ 427/79, 81, 577, 427/578, 580, 255.7; 437/919; 204/192.22

[56] References Cited

U.S. PATENT DOCUMENTS

| | | | |
|---|---|---|---|
| 4,636,833 | 1/1987 | Nishioka et al. ........................ | 357/71 |
| 5,249,554 | 10/1993 | Tamor et al. ........................ | 123/90.51 |
| 5,266,409 | 11/1993 | Schmidt et al. ........................ | 428/446 |
| 5,275,967 | 1/1994 | Taniguchi et al. ........................ | 437/127 |

OTHER PUBLICATIONS

Demichelis et al., Materials Science and Engineering, B11, pp. 313–316 (1992).

El Khakani et al., J. Appl. Phys., 74, pp. 2834–2840 (1993).

*Primary Examiner*—Roy V. King
*Attorney, Agent, or Firm*—William H. Pittman

[57] ABSTRACT

Capacitors with high dielectric strength and low dissipation factor over a wide range of frequencies comprise two or more conductive layers separated by at least one dielectric layer. The dielectric layer is of silicon-doped amorphous hydrogenated carbon, with suitable dopants including silane (which is preferred), tetraalkoxysilanes and polyorganosiloxanes.

11 Claims, No Drawings

CAPACITOR DIELECTRICS OF SILICON-DOPED AMORPHOUS HYDROGENATED CARBON

BACKGROUND OF THE INVENTION

This invention relates to capacitors and their production, and more particularly to capacitors having amorphous hydrogenated carbon dielectrics with high dielectric strength and low dissipation factor.

Capacitors are commonly employed as elements in electrical circuits to reduce voltage fluctuations in electronic power supplies, to transmit pulse signals, to generate or detect electromagnetic oscillations at radio frequencies, to provide electronic time delays and the like. Typical capacitors have two or more conductive layers separated by at least one dielectric layer.

Various materials are known to be useful as dielectric layers in capacitors. In recent years, a material of this type which has been of increasing interest is amorphous hydrogenated carbon, also known as diamondlike carbon and hereinafter sometimes designated "DLC". It is described in U.S. Pat. No. 5,275,967 as being principally composed of carbon of $SP^3$ structure, having a diamond structure over a short distance but showing disordered amorphous character over a longer distance. As described in *Chemical and Engineering News,* May 15, 1989, pp. 32–33, films of this material are generally amorphous but can have very small crystals, typically less than 2–20 nm. in diameter, and can contain from almost 0 to more than 50% hydrogen. When they are characterized by greater than 0.2 gram-atoms of carbon per cc., they can possess properties very close to diamond, including high dielectric strength and low dissipation factor.

It is of interest to raise the dielectric strength and lower the dissipation factor of DLC even further. Higher dielectric strength would allow a corresponding increase in operating electric stress and a decrease in the film thickness required to achieve a specified voltage rating. A decrease in film thickness permits a decrease in deposition time, which in turn reduces cost. It also increases capacitance per layer, whereupon fewer dielectric layers are necessary for a given total capacitance. Decrease in dissipation factor increases capacitor life and provides higher circuit efficiency.

Dissipation factor generally varies with the frequency of the voltage signal at the capacitor terminals. A typical capacitor having DLC dielectric layers will have an adequately low dissipation factor at low to moderate frequencies, on the order of 60–100,000 Hz, which are characteristic, for example, of motors. At frequencies above 1 MHz, however, the dissipation factor rises substantially and may render the capacitor incapable of use in articles operating at such frequencies.

The present invention is based on the discovery that the doping of DLC films with low proportions of silicon results in a substantial increase in dielectric strength and decrease in dissipation factor at high frequencies. It is known that doping with silicon decreases frictional coefficient and improves tribological properties; Demichelis et al., *Materials Science and Engineering,* B11,313–316 (1992). However, the improvement of dielectric properties by silicon doping is not believed to have been previously reported.

SUMMARY OF THE INVENTION

In one of its aspects, the invention is a capacitor comprising two or more conductive layers separated by at least one dielectric layer, said dielectric layer being of silicon-doped amorphous hydrogenated carbon having a silicon content of about 1–10 atomic percent.

Another aspect of the invention is a method for fabricating a capacitor which comprises providing a first conductive layer; depositing a silicon-doped amorphous hydrogenated carbon dielectric layer as described above on said conductive layer; and depositing a second conductive layer on said dielectric layer.

DETAILED DESCRIPTION; PREFERRED EMBODIMENTS

The capacitors of this invention are conventional in comprising two or more conductive layers separated by at least one dielectric layer. They include stacked capacitors in which multiple conductive layers are separated by more than one dielectric layer. The conductive layers are of a conductive metal, typically aluminum, zinc or an aluminum/zinc alloy.

The dielectric layer or layers in the capacitors of this invention are principally of DLC. Various methods for depositing DLC on the conductive layer are known; they include plasma enhanced chemical vapor deposition (hereinafter "PECVD"), cascaded arc, sputtering and ion beam deposition.

In a typical PECVD operation, the carbon source is a volatile organic compound such as a $C_{1-4}$ alkane, butadiene, acetylene, acetone, methyl ethyl ketone, toluene or ethylbenzene. Hydrocarbons such as methane and butadiene are frequently preferred. The organic compound is ordinarily diluted with an inert gas such as argon. Typical deposition conditions include argon and organic compound flows of about 60–80 sccm, a power density of about 0.5–0.75 W/cm², a substrate temperature of about 20°–40° C., a pressure of about 100–300 millitorr and a time of about 20–40 minutes to produce a carbon film about 7,000–10,000 Å in thickness.

It is frequently preferred to condition the conductive layer for adhesion of the carbon layer prior to its deposition. This may be done by subjecting it to a flow of argon, typically at about 60–80 sccm, at a higher power density, typically in the range of about 0.5–0.75 W/cm², for about 10–15 minutes. When this conditioning operation is complete, flow of organic compound may be commenced briefly to provide an adhesion interface. The power can then be decreased, the flow of argon and organic compound maintained and deposition continued until a dielectric layer of the desired thickness, typically about 5,000–10,000 Å, is produced.

According to the present invention, the materials introduced during the deposition operation include a dopant amount of a silicon compound. Suitable silicon compounds include silanes(i.e., silicon-hydrogen compounds), tetraalkoxysilanes and polyorganosiloxanes (hereinafter "silicones"). By reason of their high volatility, silanes (i.e., silicon-hydrogen compounds of the formula $Si_nH_{2n+2}$) and lower alkoxysilanes ("lower" meaning an alkoxy group containing up to 7 carbon atoms) such as tetraethoxysilane are preferred, with silane ($SiH_4$) being most preferred.

When the silicon compound is a volatile one such as silane or tetraethoxysilane, it may conveniently be incorporated in the argon employed in the deposition. Non-volatile silicon compounds such as silicones may be heated under conditions which cause saturation of the atmosphere in the deposition vessel therewith.

In general, conditions are employed which will provide the desired silicon proportion within a reasonable time. In the case of incorporation in the argon, suitable conditions are typically a volume concentration of about 1–10% of the silicon reagent in argon, based on the total of silicon reagent and argon. It is usually preferred to introduce the silicon reagent gradually after carbon deposition has commenced. Analytical methods such as electron spectroscopy for chemical analysis (ESCA) may be employed to determine the proportion of silicon.

The final stage of the deposition process is ordinarily performed under the same conditions employed for initial conditioning of the substrate. These include high power level, freedom from silicon reagent and gradual decrease of the flow of carbon compound.

The method of this invention can be employed for the fabrication of capacitors having a single dielectric layer separating two conductive layers. It is also within the scope of the invention to deposit a plurality of alternating dielectric and conductive layers.

The invention is illustrated by an example employing two silicon wafers, each coated by sputtering with aluminum to a thickness of 1000 Å. A control wafer is conditioned by treatment with an argon plasma as follows:

| | |
|---|---|
| Pressure, millitorr | 200 |
| Argon flow, sccm | 75 |
| Power density, W/cm$^2$ | 0.61 |
| Substrate temperature, °C. | 30 |
| Time, minutes | 12 |

Butadiene is then introduced into the plasma at 75 sccm and an adhesion interface is deposited for 1 minute. The power density is decreased to 0.11 W/cm$^2$ and DLC deposition is performed for 30 minutes, to a thickness of about 8500 Å. The power density is then again raised to 0.61 W/cm$^2$ and the flow of butadiene is gradually reduced to zero.

A second wafer according to the invention is treated identically except that the argon flow during the deposition step is replaced by a flow of 2% (by volume) silane in argon. At the completion of the deposition, the silane-argon mixture is again replaced by argon, after which deposition is terminated in the same manner as for the control.

An array of aluminum dot electrodes, 6.4 mm. in diameter and 250 Å in thickness, is deposited by sputtering on each DLC film and dielectric strength and dissipation factor measurements are made. The results are listed in the following table.

| | Control | Si-doped |
|---|---|---|
| Atom % Si, by ESCA | 0 | 2 |
| Dielectric strength, MV/cm.: | | |
| Average | 3.7 | 4.6 |
| Peak | 4.1 | 5.1 |
| Dissipation factor: | | |
| 100 kHz | 0.03 | 0.05 |
| 1 MHz | 0.4 | 0.05 |

It is apparent that the silicon-doped sample of the invention is superior to the control in both average and peak dielectric strength, and also in the maintenance of a low and consistent dissipation factor over a wide range of frequencies.

What is claimed is:

1. A method for fabricating a capacitor which comprises providing a first conductive layer; depositing a dielectric layer on said conductive layer, said dielectric layer being of silicon-doped amorphous hydrogenated carbon having a silicon content of about 1–2 atomic percent; and depositing a second conductive layer on said dielectric layer.

2. A method according to claim 1 wherein the conductive layers are of aluminum, zinc or an aluminum/zinc alloy.

3. A method according to claim 1 wherein the source of the amorphous hydrogenated carbon in the dielectric layer is a $C_{1-4}$ hydrocarbon, butadiene, acetylene, acetone, methyl ethyl ketone, toluene or ethylbenzene.

4. A method according to claim 1 wherein the first conductive layer is conditioned for adhesion of the dielectric layer prior to deposition of said dielectric layer by subjecting it to a flow of argon at a power density in the range of about 0.5–0.75 W/cm$^2$.

5. A method according to claim 1 wherein a silane, a tetraalkoxysilane or a polyorganosiloxane is the source of the silicon in the dielectric layer.

6. A method according to claim 5 wherein the silicon source is silane ($SiH_4$).

7. A method according to claim 6 wherein the silane is introduced in combination with argon at a volume concentration of about 1–10%, based on the total of silicon reagent and argon.

8. A method according to claim 1 wherein the dielectric layer is deposited by plasma enhanced chemical vapor deposition.

9. A method according to claim 1 wherein the dielectric layer is deposited by cascaded arc.

10. A method according to claim 1 wherein the dielectric layer is deposited by sputtering.

11. A method according to claim 1 wherein the dielectric layer is deposited by ion beam deposition.

* * * * *